United States Patent [19]

Jackson

[11] 4,094,783

[45] June 13, 1978

[54] CENTRIFUGAL FLOTATION SEPARATOR

[76] Inventor: George F. Jackson, 5745 E. 47 Pl., Tulsa, Okla. 74135

[21] Appl. No.: 837,833

[22] Filed: Sep. 29, 1977

[51] Int. Cl.² .................................................. C02B 1/34
[52] U.S. Cl. ..................................... 210/63 R; 210/84; 210/97; 210/197; 210/221 P; 210/512 R; 210/519
[58] Field of Search .................. 210/63 R, 84, 97, 101, 210/104, 322, 221 P, 197, 512 R, 519

[56] References Cited

U.S. PATENT DOCUMENTS

| 3,250,394 | 5/1966 | Clark | 210/221 P |
|---|---|---|---|
| 3,498,461 | 3/1970 | Miller | 210/322 X |
| 3,558,255 | 1/1971 | Rose | 210/101 X |
| 3,771,290 | 11/1973 | Stethem | 210/512 R |

Primary Examiner—John Adee
Attorney, Agent, or Firm—Head, Johnson & Chafin

[57] ABSTRACT

A multi-stage, recycling, centrifugal, flotation separator system, comprising a circular cylindrical vessel with vertical axis, having a horizontal tray positioned inside the vessel near the top, the tray having an axial opening. Means for introducing air under pressure into the vessel at the top thereof, and means for introducing contaminated liquid into the vessel through a tangential pipe, under pressure, at a level below the tray. Means to recycle air from the top of the vessel into the inlet line and to mix the recycled air with the contaminated liquid before entry into the vessel. Means to recycle liquid from the bottom of said vessel, through a tangential pipe into the vessel at a level below that of the contaminated liquid, and means to mix recycled air with the recycled liquid prior to entry into the vessel.

10 Claims, 5 Drawing Figures

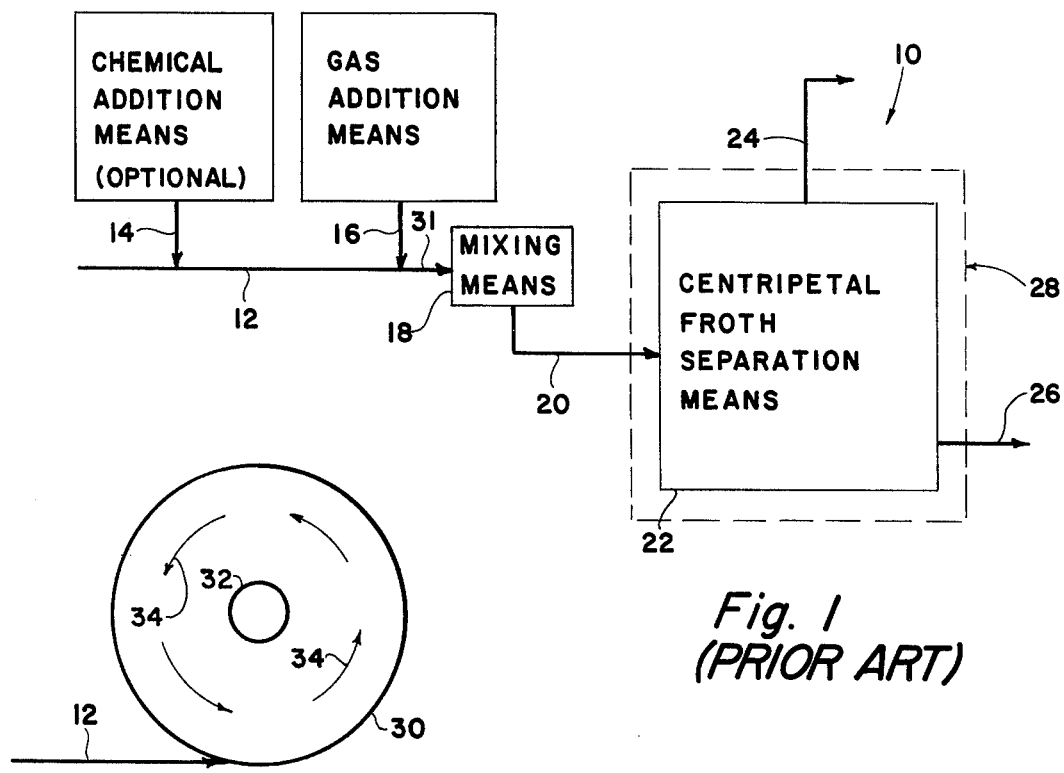
Fig. 1 (PRIOR ART)
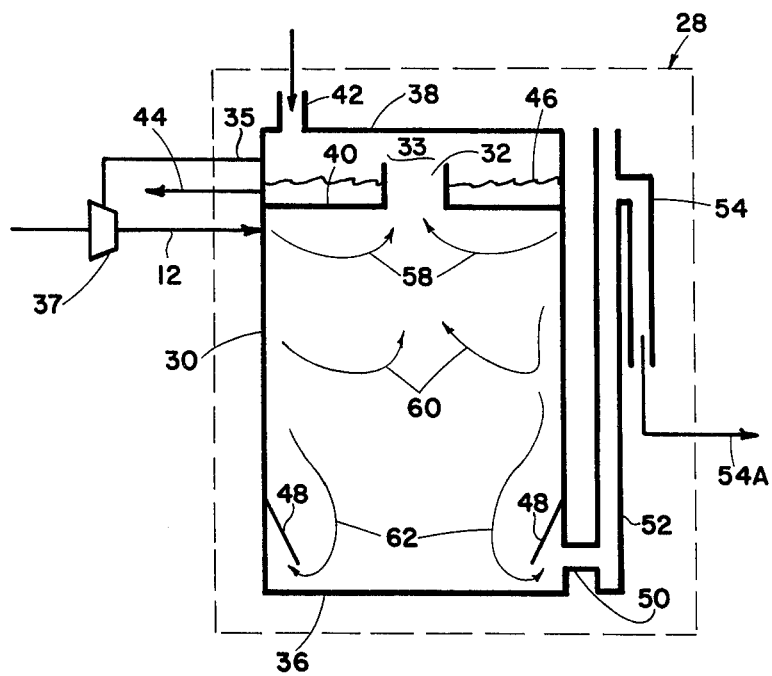
Fig. 2A
Fig. 2

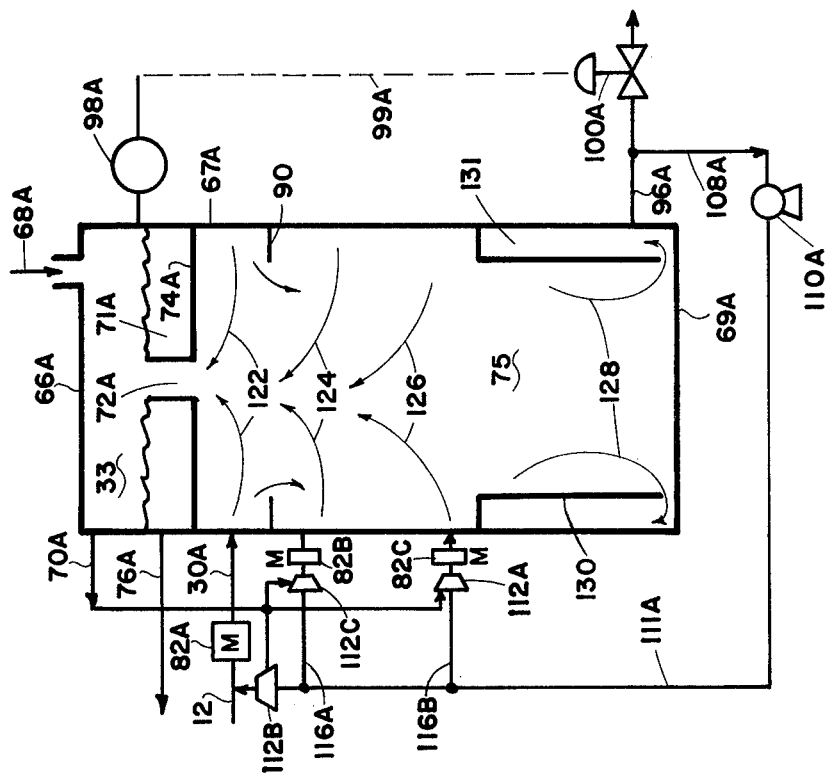
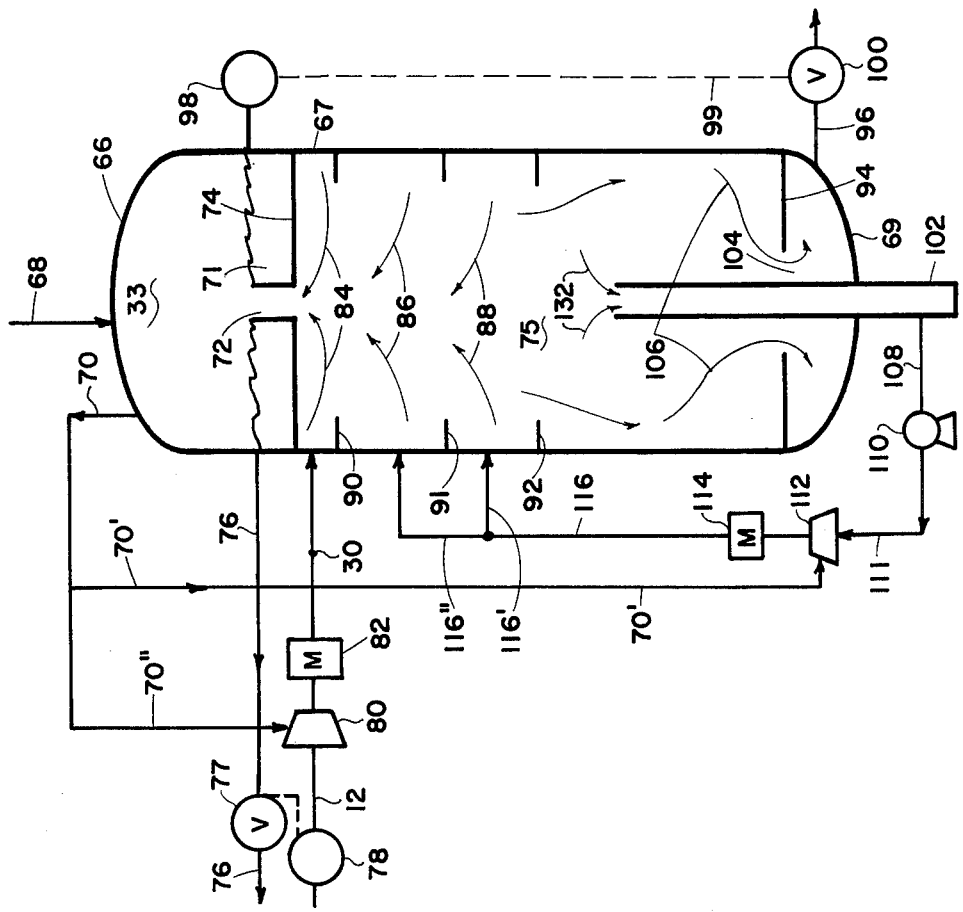
Fig. 4
Fig. 3

CENTRIFUGAL FLOTATION SEPARATOR

BACKGROUND OF THE INVENTION

1. Field of the Invention

This invention lies in the field of flotation separators. More particularly, it is concerned with apparatus for separating particles or droplets of contamination from a liquid by flotation means.

Still more particularly, this invention concerns a multi-stage type of centrifugal flotation separator.

2. Description of the Prior Art

This invention is involved in the specific apparatus to separate a suspended material from a liquid by dispersed air flotation.

A typical example is the separating of suspended material from water as the result of vigorous mixing with air, so that air bubbles become attached to particles of the contaminant. The particles attached to the bubbles float to the surface for skimming, leaving a cleaner liquid.

The idea of flotation separation is old. Some of the names for processes of this type now in use are:
 Dispersed air flotation,
 Induced air flotation,
 Froth flotation, and
 Froth or foam fractionation.

In the above processes, air is introduced by mechanical mixers, blowers, dispersers or eductors.

SUMMARY OF THE INVENTION

It is a primary object of this invention to provide a multi-stage centrifugal flotation separator system, which overcomes the deficiencies of prior art systems, and provides a single apparatus, having multiple stages of separation, with a consequent greater efficiency and reduced cost.

These and other objects are realized and the limitations of the prior art are overcome in this invention by providing a closed circular cylindrical vessel, with a tray or baffle positioned inside the vessel near the top thereof, and having an axial opening and wall for the upward flow of froth and gas bubbles.

The contaminated liquid is introduced through a line tangential to the wall of the vessel so that the entering contaminated liquid with air mixture is circulated in a whirling motion around the inner wall of the vessel, providing considerable residence time, so that the air bubbles will have opportunity to move centripetally toward the center, and to rise through the opening in the baffle or tray, to the zone above the tray, where the foam is broken and gas is released to be recycled into the inlet liquid line. Also, liquid from the bottom zone of the tank is recycled, by being pumped through an eductor which introduces recycled air or gas, and then through a mixing device in-line. The recycled gas and liquid are then injected through at least one tangential opening. Several tangential openings may be provided through the wall of the vessel like the initial liquid entry. These recycle openings are spaced apart below the entry of the contaminated liquid.

The clean liquid is drawn from the bottom of the tank in a region close to the outer wall where it is the cleanest. Annular plate rings may be fastened on the inside wall of the tank between the separate inlets of the initial contaminated liquid and the one or more entries of recycled gas and liquid. These annular plates, or rings, prevent direct mixture of the entering flows, and therefore provide better opportunity for centripetal separation of the gas or air, and the liquid.

A foam, froth or liquid is drawn from above the tray by an outlet pipe placed a short distance above the tray. The rate of outward flow of foam can be controlled as a function of the inlet flow of contaminated water. Also, if desired, the flow rate of outlet cleaned water can be controlled as a function of the level of froth above the plate.

The entry of recycled gas into the incoming streams of contaminated water and recycled water, or other liquid, can be introduced through eductors, or can be introduced into the water lines, by means of compressors, etc., as is well known in the art. In the case of certain liquids, such as water contaminated with oil droplets, a very rigorous mixing device may not be desirable since such a mixer might form very tight emulsions, which would be hard to break at the outlet of the separator.

Also, chemicals for foam breaking and emulsion breaking can be introduced with the inlet contaminated liquid if desired.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 represents in simple flow diagram notation the prior art system. The critical part of such a system lies in the separator means indicated generally by the numeral 28 identifying a dashed box surrounding the separator.

FIG. 2 illustrates a simple one-stage type of separator using the tangential inlet flow of contaminated water illustrated in FIG. 2A.

FIGS. 3 and 4 indicate two improved multi-stage versions of the centrifugal flotation separator of FIG. 2.

DESCRIPTION OF THE PREFERRED EMBODIMENTS

Referring now to the drawings and in particular to FIG. 1, there is shown in block diagram form the basic elements of a gas liquid flotation separator. Shown is a line 12 for inlet of contaminated liquid under pressure. There are means 14 for the addition of chemicals for emulsion or foam breaking, if desired. Gas entry is indicated by the line 16. The gas may be of any suitable composition or as in most cases will be air. The liquid and gas and chemicals in the line 31 then go to a mixer 18, which can be of any conventional type to turbulently mix the air and liquid so that the contamination particles or droplets will be contacted by air bubbles, to which they will be attached. The outlet of the mixture in line 20 goes to the froth separator vessel 22 which is of generalized design having a liquid entry 20, a gas froth outlet 24, a clean liquid outlet 26. The apparatus outlined in the dashed box 28 is shown in greater detail in one form of this invention by the same number 28.

Turning now to FIGS. 2 and 2A, there is a first embodiment of this invention shown as a cylinder 30 having a closed top and bottom 38 and 36 respectively. Inside the vessel 30 is a barrier or tray 40 horizontally positioned near the top 38. This tray has a central opening 32 through which air bubbles and froth of liquid pass upwardly into the space 33 above the tray, where the froth 46 can be broken, and gas released. Air is supplied through inlet pipe 42. The froth is drawn off by line 44, and the released gas is recycled with the incoming liquid through the eductor 37 in line 12, as will be explained in greater detail in FIGS. 3 and 4.

In the vessel 30, the entering liquid flows as a ring circling around the inside wall of the tank, under the tray 40, while the gas separates and flows inwardly toward the axis of the tank, in accordance with arrows 58, and upwardly through the opening 32 in the space 33, as a froth which settles in the tray 40, in accordance with the level 46. Some of this partially broken froth with contaminates is drawn off through the line 44.

As the water circulates and the gas separates, the water being denser moves outwardly toward the wall still circling and moving downwardly in a helical path, while the air bubbles separate in accordance with arrows 60 in toward the center and up through the opening 32.

The arrows 62 indicate the liquid from which the contaminant has separated, which falls downwardly along the wall of the vessel and along the baffle 48 to provide a volume of clean water at the bottom, close to the outside wall which is drawn off through the pipe 50, the stand pipe 52, and leaves the separator as clean water through pipes 54 and 54A.

FIG. 2A illustrates the tangential entry of water and gas through line 12 into the tank 30, and the counter-clockwise circulation as indicated by the arrows 34.

What has been described in FIGS. 2 and 2A is an improved version of the flotation separator which embodies the tangential entry of the liquid and gas and the helical downward movement of liquid along the wall of the vessel and the axially, inwardly movement of the gas towards the axis and rising of the gas bubbles to the zone 33 above the tray, where the gas bubbles break and the air is recycled, etc.

Referring now to FIG. 3, there is shown an improved version of the apparatus of FIG. 2, which also embodies the centrifugal flow of the inlet contaminated water through the lines 12 and 30, which enters the tank 67 in a tangential manner, causing the ring flow of the mixture of gas bubbles and liquid. This is not shown specifically in FIGS. 3 and 4, but as indicated in FIG. 2A, is an important mode of introduction of liquid and gas at one or more different levels in the tank.

In FIG. 3, the vessel is indicated by the numeral 67 which is a circular cylindrical vessel having a vertical axis having a top 66 and a bottom 69. Air enters the space 33 through pipe 68. Again, the barrier or tray 74 is provided to separate the liquid-gas mixture zone 75 below the tray 74, from the foam breaker portion of the volume 33 above the tray. The entering contaminated liquid comes by line 12 and is mixed with air in an eductor 80 as is well known, or by other means such as pressure flow, into the mixer 82 where the gas and liquid are thoroughly mixed. Although any liquid can be used, in many cases the liquid will be water and similarly any gas may be used, although in most cases the gas will be air. For purposes of description it will be assumed in each case that the liquid is water and the gas is air, although it will be understood that any liquid and any gas can be used.

The mixture of air and water in line 30 then enters the tank 67 in a tangential manner, such as shown in FIG. 2A. The point of entry is a short distance below the bottom of the tray 74, and the flow is in the form of a swirling volume of liquid and gas, with the gas bubbles separating out, and moving towards the center of the vessel and up through a central tubular opening 72 to the foam breaker section 33.

The broken and unbroken foam 71 resting in the tray is skimmed off through the line 76. This carries with it the impurities or contamination that was removed from the entering liquid. The gas that has been broken out of the foam, along with entering air introduced by the line 68 into the space 33, leaves by the line 70, to go by line 70" to the eductor 80, to be recycled into the tank.

The entering mixture of gas and water flows in a swirl around the tank above a baffle 90, which is an annular plate which prevents immediate downward flow of the water, and increases residence time, providing opportunity for the bubbles to move inwardly and upwardly in accordance with arrows 84.

There are shown in FIG. 3, two other entries 116' and 116", which are positioned below the primary water inlet 30. Like inlet 30, these are also tangential inlets. They are supplied by line 116, with recycled water and recycled air. The recycled water is taken from the axial pipe 102 mounted through the bottom 69 of the vessel. This water which contains some bubbles and contaminates, is then pumped from line 108 by means 110, and through the pump outlet line 111 to an eductor 112 which draws in the recycled air in the line 70'. This recycled air and water then goes through a mixer 114 similar to 82 in the inlet line, and, then by the lines 116' and 116" into the interior of the vessel.

There are preferably ring barriers 91 and 92 positioned below each of the inlets 116' and 116" to prevent direct mixing of the inlets, and cause the separation of gas bubbles from each of them. Thus the arrows 86 show the motion inwardly and upwardly of air bubbles from the first recycled flow through inlet 116". Similarly the arrows 88 show gas bubble flow from the second recycled inlet 116' and so on. While two recycled inlets have been shown, providing, in effect, three stages of separation, any number of recycled inlets can be provided.

By means of the circumferential or centrifugal flow, and the slow downward helical movement of the water along the inner wall of the vessel, a long residence time is provided, giving maximum opportunity for the gas bubbles to leave the liquid. The water then flows down along the wall in accordance with arrows 106, and through an opening 104 in a baffle 94 at the bottom of the tank, providing a volume of clear processed liquid that leaves the tank by the line 96.

Shown also in FIG. 3 is a control valve 100 on the outlet line 96, which is controlled by means 99 from a level sensor 98, at the top of the tank, which is sensitive to the level of foam in the tray. In other words, the outlet flow can be controlled so as to maintain a selected level of foam in the tray.

There are a number of combinations of an inlet line such as 30, having a mixture of entering contaminated liquid with air, plus one or more recycled inlets such as 116' and 116", and inlet baffles 90, 91, 92 in the vessel can be different.

In FIG. 4 is shown another variation of the design of the vessel of FIG. 3. In most respects it is similar to that of FIG. 3 where the entering air into the top section 33 of the vessel is indicated by numeral 68A to correspond to that of 68 of FIG. 3. The outlet for recycled air is indicated as 70A, and is supplied, as before, through an eductor 112B in the recycled water line 111A, that provides recycled water and air into the inlet line 12, which goes to the mixer 82A, and then to the tangential entry line 30A into the tank. Separate eductors 112A, 112C and mixers 82B, 82C are shown in the two recycle lines, 116A, 116B.

In FIG. 4 the recycled water is drawn from the outlet line 96A rather than through the axial pipe 102, which is then pumped and provides water to mix with the entering contaminated water in line 12, and also to flow through the separate inlets 116A and 116B. One of the inner annular baffles 90 is shown and others may be used as indicated in FIG. 3.

The bottom end of the tank is provided with a cylindrical baffle 130 which confines the clean water flowing downwardly, to go in the path of arrows 128, and to settle in the annular portion of the tank 131 from which it is drawn off by the line 96A. Again, a control valve 100A is shown in the outlet line which, by means 99A, is responsive to the level sensor 98A, monitoring the level of the foam in the tray 74A.

What has been described is an improved type of gas liquid flotation separator which embodies a number of improved principles, namely, the use of tangential inflow of the contaminated water, and of the recycled water. Another improvement is the use of a tray which can provide residence time for the breaking of the foam and release of air for recycling into the water inlet lines.

Another feature is the use of the annular baffles along the inside of the wall to separate the multiple zones or stages of the separator.

It is possible, of course, to combine FIG. 3 and FIG. 4. Thus, the second stage of separation of FIG. 3 which would utilize the input 116" and take its recycled water from the axial pipe 102 in the tank. Then the third stage of water entry through 116' could draw its recycled water from the outlet pipe 96A in accordance with FIG. 4. Thus, the inlet water through line 30 would be the most contaminated, the second stage of separation with inlet 116" would use a less contaminated liquid drawn into the recycle pipe 102 in accordance with arrows 132, and the third stage of separation lower down in the tank and utilizing inlet 116' would use cleaner water for recycle such as that drawn off by the outlet pipe 96A, and so on.

By placing the various stages of recycle in different zones in the vessel in which the lower zones are proportionally cleaner than the upper zones, a multi-stage separation can be provided in which the lower zone has a recycle water that is cleaner than the recycle water in the next stage above which is cleaner than the inlet water, in the entry stage above that.

It will be clear also that many components of this system are well known in the industry, namely, that the air mixture to the liquid can be by eduction, or by pressure flow, as is well known in the art. Also various gases and various liquids may be used in combination. Also the amount of mixture of the gas and liquid can be varied in accordance with the characteristics of the contamination. For example, if the contamination is oil droplets and water then very rapid mixing might not be desired, since that might produce tight emulsions. In other cases where there are no dangers of emulsions, the more rapid mixture is preferred so that there will be better contact between air and the smaller particles of contamination in the liquid. Also selected chemicals can be supplied which will enhance the attachment of the particles of contamination to the air bubbles and thus provide more perfect removal of the contamination.

Also control of the outlet water can be made in terms of the level of foam standing in the tray. Also the rate of flow of foam out of the outflow line 76 can be controlled by means of a vlave 77 which is responsive through flow meter 78 to the rate of flow of inlet water in line 12. By this means the rate of flow of foam and contamination can be made a selected percentage of the total inflow.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A multi-stage, recycling, centrifugal flotation separator system, comprising:
   (a) circular cylindrical closed vessel with vertical axis, having a horizontal tray positioned inside near the top of said vessel, said tray having an axial opening;
   (b) first inlet means for introducing air into said vessel at the top thereof;
   (c) first outlet means positioned above said tray for outlet of contaminated froth;
   (d) second outlet means near the top of said vessel, above said tray for recycling of air;
   (e) third outlet means near the bottom thereof for removal of cleaned liquid from said vessel;
   (f) second inlet means for introducing contaminated liquid into said vessel, said second inlet means comprising a pipe entering said vessel tangentially at a level just below said tray; and
   (g) at least one third inlet means, for introducing recycled liquid from the bottom volume of said vessel, and means to conduct said recycled liquid to said third inlet means; said third inlet means comprising a pipe entering said vessel tangentially at a level a selected distance below said second inlet means.

2. The separator as in claim 1 including first eductor means on said second inlet means, and means to carry recycled air from said second outlet means to said first eductor means.

3. The separator as in claim 2 including a first mixing means connected in said second inlet means downstream of said first eductor means.

4. The separator as in claim 1 including at least one horizontal annular ring baffle means of selected radial width attached to the inside wall of said vessel between said second inlet means and said third inlet means.

5. The separator as in claim 1 including in series with said at least one third inlet means, second eductor means and second mixing means, and means to carry recycled gas from said second outlet means to said second eductor means.

6. The separator as in claim 1 in which said recycled liquid is drawn from said vessel by means of an axial pipe through the bottom of said vessel.

7. The separator as in claim 1 in which said recycled liquid is drawn from said third outlet means.

8. The separator as in claim 1 including controllable valve means in said third outlet means responsive to sensor means detecting the level of froth above said tray.

9. The separator as in claim 1 including controllable valve means in said first outlet means responsive to flow sensing means insaid second inlet means.

10. In a multi-stage recycling centrifugal flotation separator system comprising a circular cylindrical closed vessel with vertical axis having a horizontal tray positioned inside the vessel near the top thereof, said tray having an axial tubular opening, the method of operating said separator comprising the steps of;

(a) introducing air under pressure into said vessel at the top thereof;

(b) introducing contaminated liquid into said vessel through a tangential inlet pipe near the top of said vessel but under said tray;

(c) drawing off contaminated froth from an outlet positioned above said tray;

(d) drawing off air to be recycled from the space above said tray, through a pipe near the top of said vessel;

(e) drawing off clean liquid from the bottom of said vessel;

(f) introducing said air to be recycled into an eductor into the inlet contaminated liquid, and mixing the recycled air and liquid before entry into the vessel;

(g) recycling liquid from the bottom of said tank into the tank through tangential pipe means at a point below the entry of the contaminated liquid; and (h) introducing recycled air into the recycled liquid and mixing said recycled air and recycled liquid before entry into the vessel.

* * * * *